3,190,896
SELECTIVE KETALIZATION OF POLYKETO-5α-ANDROSTANES AND 3-DIMETHYL KETALS PRODUCED THEREBY
Walter R. Benn, Deerfield, Ill., assignor to G. D. Searle & Co., Chicago, Ill., a corporation of Delaware
No Drawing. Filed Mar. 1, 1963, Ser. No. 262,219
4 Claims. (Cl. 260—397.4)

The present invention relates to a novel process for the manufacture of 3-dimethyl ketals of steroids possessing the 5α-androstane structure and especially to a process for the selective ketalization of the 3-keto group of a 5α-androstane possessing additional potentially ketalizable keto groups.

This invention encompasses also the novel 3-dimethyl ketal of 5α-androstane-3,6,17-trione.

The instant process is conducted by contacting the 3-keto-5α-androstane starting material with methyl alcohol at or near room temperature in the presence of an acid catalyst. Under these conditions, the 3-keto group reacts rapidly while other keto groups remain unaffected, thus producing the 3-dimethyl ketal in substantially quantitative yield. In addition to the high yields obtained, the present process possesses the advantage of utilizing inexpensive reagents, i.e., methyl alcohol and an acid catalyst. Suitable acid catalysts are typified by p-toluenesulfonic acid, perchloric acid, hydrochloric acid, and sulfuric acid. In this connection, an anhydrous catalyst is preferred in order to afford maximum yields. As is mentioned above, the present process can be carried out effectively at room temperature, although the reaction may be accelerated, in some cases, by warming in order to achieve homogeneity. Elevated temperatures may also be used but offer no advantage. The rate of reaction can be increased also by avoiding an undue excess of methanol in order to allow the ketal to precipitate from the reaction mixture as it is produced, thus driving the equilibrium in the desired direction. The process comprising the present invention is specifically illustrated by the reaction of 5α-androstane-3,17-dione with methyl alcohol and p-toluenesulfonic acid at 25–40° to afford 5α-androstane-3,17-dione 3-dimethyl ketal. An additional example further demonstrating the specificity of this process is the production of 5α-androstane-3,6,17-trione 3-dimethyl ketal by the reaction of 5α-androstane-3,6,17-trione with methyl alcohol in the presence of p-toluenesulfonic acid.

The 3-dimethyl ketals of the present invention are useful as intermediates in the manufacture of compounds possessing useful pharmacological properties. The aforementioned 5α-androstane-3,17-dione 3-dimethyl ketal, for example, is allowed to react with sodium borohydride in methanol to yield 17β-hydroxy-5α-androstan-3-one 3-dimethyl ketal. Cleavage of the ketal function by reaction with hydrochloric acid in aqueous methyl alcohol results in 17β-hydroxy-5α-androstan-3-one, a well-known androgenic agent. This process for the conversion of 5α-androstane-3,17-dione to 17β-hydroxy-5α-androstan-3-one is conveniently carried out without isolating the intermediates, resulting in high yields, i.e., 95–97%, of the product.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight except where otherwise noted.

Example 1

To a slurry of 40 parts of 5α-androstane-3,17-dione in 320 parts of methanol is added 0.1 part of p-toluenesulfonic acid monohydrate, and the resulting reaction mixture is stirred and warmed to about 40°, then is allowed to cool to room temperature over a period of about one hour. Approximately 0.5 part of pyridine is added, and this mixture is partially concentrated at reduced pressure, resulting in crystallization of 5α-androstane-3,17-dione 3-dimethyl ketal, which melts at about 127–128° and displays a characteristic infrared absorption maximum at about 5.75 microns. It is represented by the structural formula

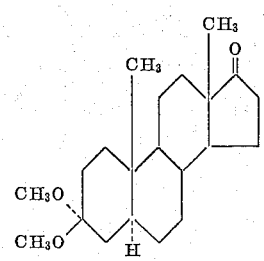

Example 2

A mixture of one part of 5α-androstane-3,6,17-trione, 8 parts of methyl alcohol, and 0.01 part of p-toluenesulfonic acid monohydrate is allowed to stand at room temperature for about 15 minutes, resulting in precipitation of the solid product. This precipitate is collected by filtration and dried to afford 5α-androstane-3,6,17-trione 3-dimethyl ketal, melting at about 211–214° and displaying characteristic infrared absorption maxima at about 5.75 and 5.84 microns. An additional quantity of this ketal is obtained by adding to the filtrate one part of pyridine, concentrating the solution to a small volume at reduced pressure, and collecting the resulting crystals by filtration. This compound is represented by the structural formula

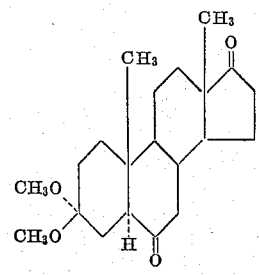

Example 3

A methanolic slurry of 5α-androstane-3,17-dione 3-dimethyl ketal, prepared according to the procedure of Example 1, is cooled by means of an ice bath, and a solution of 8 parts of sodium borohydride in 160 parts of cold methanol is added. The cooling bath is removed, resulting in an initial temperature rise to about 35°, followed by a drop to room temperature. The total reaction time amounts to about one hour.

To the latter mixture containing 17β-hydroxy-5α-androstan-3-one 3-dimethyl ketal is added successively 2 parts of acetic acid and a solution of 21.4 parts of concentrated hydrochloric acid in 180 parts of water. Warming to about 45° results in dissolution of the suspended solids, at which time 70 parts of hot water is added, and the aqueous mixture is allowed to cool to room temperature. The precipitated product is collected by filtration and washed on the filter with methanol to yield pure 17β- hydroxy-5α-androstan-3-one, melting at about 178–181°. Further pure material melting at about 177–180° is obtained by dilution of the filtrate with water.

*Example 4*

The methanolic solution containing 17β-hydroxy-5α-androstan-3-one 3-dimethyl ketal, prepared according to Example 3, is concentrated to a small volume under reduced pressure, then is extracted with ether. The resulting organic solution is washed with water, dried over anhydrous sodium sulfate, and concentrated to dryness at reduced pressure. Crystallization of the residue from methanol containing a small amount of pyridine affords pure 17β-hydroxy-5α-androstan-3-one 3-dimethyl ketal, melting at about 201–203° with decomposition.

What is claimed is:

1. A process for the selective ketalization of the 3-keto group of a 5α-androstan-3-one possessing an additional keto function in at least one of the 6- and 17-positions and lacking substitution by large groups at the 2 and/or 4 positions, which comprises contacting that 5α-androstan-3-one with methanol in the presence of an acid catalyst, thus affording the 3-dimethyl ketal.

2. A process for the manufacture of a 3-dimethyl ketal of the structural formula

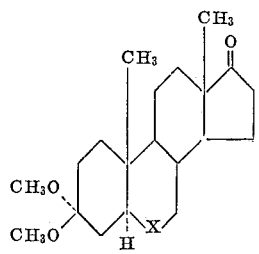

wherein X is a member of the class consisting of methylene and carbonyl radicals, which comprises contacting a compound of the structural formula

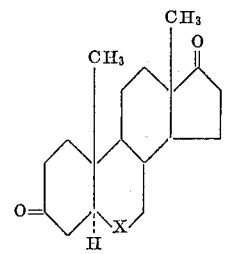

wherein X is a member of the class consisting of methylene and carbonyl radicals, with methyl alcohol in the presence of an acid catalyst.

3. A process for the manufacture of 5α-androstane-3,17-dione 3-dimethyl ketal which comprises contacting 5α-androstane-3,17-dione with methanol in the presence of an acid catalyst.

4. A process for the manufacture of 5α-androstane-3,17-dione 3-dimethyl ketal which comprises contacting 5α-androstane-3,17-dione with methanol in the presence of p-toluenesulfonic acid.

References Cited by the Examiner
UNITED STATES PATENTS
2,927,921   3/60   Oliveto et al. _____ 260—230.55

OTHER REFERENCES
Amendolla et al., J. Chem. Soc., pp. 1226–33 (1954).
Janot et al., Soc. Chim. de France, pp. 2109–13 (1961).

LEWIS GOTTS, *Primary Examiner.*